(12) United States Patent
Tanaka

(10) Patent No.: US 7,523,555 B2
(45) Date of Patent: *Apr. 28, 2009

(54) WHEEL MANUFACTURING METHOD

(75) Inventor: Takeshi Tanaka, Higashiosaka (JP)

(73) Assignee: Work Co., Ltd., Higashiosaka-shi (JP)

( * ) Notice: Subject to any disclaimer, the term of this patent is extended or adjusted under 35 U.S.C. 154(b) by 677 days.

This patent is subject to a terminal disclaimer.

(21) Appl. No.: 11/110,709

(22) Filed: Apr. 21, 2005

(65) Prior Publication Data

US 2005/0274015 A1  Dec. 15, 2005

(30) Foreign Application Priority Data

Jun. 14, 2004  (JP) .............................. 2004-175055

(51) Int. Cl.
*B21K 1/38* (2006.01)
(52) U.S. Cl. .............................. 29/894.353; 29/894.323; 72/85
(58) Field of Classification Search .... 29/894–894.381; 72/85

See application file for complete search history.

(56) References Cited

U.S. PATENT DOCUMENTS 5,647,126 A * 7/1997 Wei ........................ 29/894.322

7,363,709 B2 * 4/2008 Tanaka .................. 29/894.353

FOREIGN PATENT DOCUMENTS

| JP | 2-160131 | 6/1990 |
| JP | 2003-236636 | 8/2003 |
| JP | 2003-236638 | 8/2003 |

* cited by examiner

*Primary Examiner*—Rick K Chang
(74) *Attorney, Agent, or Firm*—Kratz, Quintos & Hanson, LLP

(57) ABSTRACT

The present invention provides wheel manufacturing method comprising a pressing step in which a primary molded product having a cylindrical shape with a bottom in which a flange part that extends to the outside is disposed on the open side end part is manufactured, a working step in which a secondary molded product is obtained by cutting away the bottom part of the abovementioned primary molded product, and a spinning step in which, the secondary worked product is fit over and fastened to a rotating jig, a rim flange molding roller is pressed against the end part of the flange part while the secondary worked product is rotated together with the rotating jig, so that the flange part is gradually molded into the shape of a rim flange part, and the flange part is subsequently subjected to an angular adjustment to an appropriate angle to mold a rim flange part.

3 Claims, 10 Drawing Sheets

(a)

(b)

(c)

(d)

(a)

(b)

(a)

(b)

(a)

(b)

(c)

WHEEL MANUFACTURING METHOD

BACKGROUND OF THE INVENTION

1. Field of the Invention

The present invention relates to a wheel manufacturing method.

2. Description of the Related Art

One-piece type wheels which are integrally molded by casting, two-piece type wheels with a construction that is split into two parts, i.e., a rim and a disk, and three-piece type wheels with a construction that is split into three parts, i.e., an inner rim, and outer rim and a disk, are widely used as vehicle wheels that consist of light alloys such as aluminum alloys or the like.

In the case of two-piece type wheels and three-piece type wheels, wheels in which the disk is manufactured by casting or forging, and the rims are constructed using rolled metal plates have been adapted for practical use. Rims that are used in such cases include products in which band form rolled metal plates are rolled up into a cylindrical shape, both ends are welded, and the produced is molded into a desired shape by spinning, and products in which circular plate form rolled metal plates are press-molded into a cylindrical shape with a bottom, the bottom part is cut away, thus forming a cylindrical molded product that has flange parts, and this product is molded into a desired shape by spinning.

Furthermore, during turning and the like, a large force acts on at least the rim flange part on the design side compared to the rim flange part on the attachment side; accordingly, in order to increase the strength and rigidity of this part, parts that are constructed with an increased thickness, or parts that are folded back or curled into a cylindrical shape have been adapted for practical use (e.g., see Japanese Patent Application Laid-Open No. 2003-236638 and Japanese Patent Application Laid-Open No. 2003-236636).

In the case of one-piece type wheels, the strength can be increased by forming the rim flange parts with an increased thickness at the time of casting; however, in the case of two-piece type wheels and three-piece type wheels, because the rims are molded using rolled metal plates that have a uniform thickness, it is necessary to increase the strength of the rim flange parts by folding back the rim end parts or curling these parts into a cylindrical shape, and when the wheel is plated, the plating liquid accumulates on the inside of the folded-back part or curl, thus causing corrosion to occur in the rim flange parts.

Accordingly, wheel manufacturing methods have been proposed which are devised so that rim flange parts can be molded by increasing the thickness in two-piece type wheels and three-piece type wheels as well (for example, see Japanese Patent Application Laid-Open No. 2-160131). In such manufacturing methods, a circular plate form rolled metal plate is press-molded into a cylindrical shape that has a bottom, and the bottom part is cut away, thus manufacturing a cylindrical molded product that has flange parts. When this is subjected to spinning, a rolling roller is moved from the end part of the substantially cylindrical trunk body part toward the sides of the flange parts while being pressed against these parts so that the metal material on the side of the trunk body part is caused to move toward the sides of the flange parts, thus increasing the thickness of the flange parts; afterward adjusting the shape of the flange parts, and thick rim flange parts can be molded without folding back the rim end parts or curling these parts into a cylindrical shape.

SUMMARY OF THE INVENTION

The wheel manufacturing method described in the above-mentioned Japanese Patent Application Laid-Open No. 2-160131 was the subject of a patent application filed by the present applicant. However, when it is attempted to work this manufacturing method, a high-output spinning apparatus is required. In cases where an inexpensive, low-output existing spinning apparatus is used, the metal material of the trunk body part cannot be sufficiently moved to the sides of the flange parts, so that it is necessary to replace the spinning apparatus with a newly purchased spinning apparatus; thus, there are problems in terms of equipment economy so that this method cannot be used in a practical application.

Furthermore, engaging surfaces that make a dovetail engagement with the tire are formed on the tire sides of both rim flange parts with a shape that protrudes toward the tire. However, in cases where flange parts are clamped between a mandrel and a tailstock and rim flange parts are molded by means of a rolling roller as in the abovementioned Japanese Patent Application Laid-Open No. 2-160131, the following problem arises: namely, the engaging surfaces catch on the mandrel, so that the molded rims cannot be removed from the mandrel.

Furthermore, in the case of the second thickness-increasing spinning described in Japanese Patent Application Laid-Open No. 2-160131, the thickness is increased by pressing the rolling roller against the outer circumferential end portions of the flange parts in a state in which the entire rim parts except for the outer circumferential end portions of the flange parts are clamped between the tailstock and mandrel; consequently, deformation in the direction of the increase in the thickness of the flange parts is restricted by the mandrel and tailstock. Accordingly, in this second thickness-increasing spinning, it is difficult to increase the thickness of the rim flange part to the required thickness, so that it is necessary to use this as an auxiliary to the first thickness-increasing spinning.

It is an object of the present invention to provide a wheel manufacturing method that allows the easy molding of the rim flange parts by increasing the thickness even in the case of a low-output spinning apparatus.

The first wheel manufacturing method of the present invention comprises a pressing step in which a primary molded product having a cylindrical shape with a bottom in which a flange part that extends to the outside in a direction substantially perpendicular to the center line is disposed on the open side end part is manufactured by press-molding a rolled metal plate, a working step in which a secondary molded product is obtained by cutting away the bottom part of said primary molded product, and a spinning step in which, while the flange part is allowed to deform in the direction of the thickness thereof, the secondary worked product is fit over and fastened to a rotating jig which has a receiving surface that receives the flange part from the inside, a rim flange molding roller is pressed against the end part of the flange part in the direction of extension of the flange part while the secondary worked product is rotated together with the rotating jig, so that the flange part is gradually molded into the shape of a rim flange part, and the flange part is subsequently subjected to an angular adjustment to an appropriate angle to mold a rim flange part.

Here, in a desirable example, the bottom part of the primary molded product is cut away, and a flange part that extends to the outside in a direction substantially perpendicular to the center line is also molded on the end part located on the opposite side from the flange part of the primary molded product, to manufacture a secondary molded product which has flange parts on both end parts in the working step.

The second wheel manufacturing method of the present invention comprises a welding step in which a primary worked product is manufactured by rolling up a rolled metal plate into a cylindrical shape and welding both ends, a working step in which at least one end part of the abovementioned primary worked product is bent so that a secondary worked product which has a flange part that extends to the outside in a direction substantially perpendicular to the center line is manufactured, and a spinning step in which, while the flange part is allowed to deform in the direction of the thickness thereof, the secondary worked product is fit over and fastened to a rotating jig which has a receiving surface that receives the flange part from the inside, a rim flange molding roller is pressed against the end part of the flange part in the direction of extension of the flange part while the secondary worked product is rotated together with the rotating jig, so that the flange part is gradually molded into the shape of a rim flange part, and the flange part is subsequently subjected to an angular adjustment to an appropriate angle to mold a rim flange part.

In the spinning step in the abovementioned first and second wheel manufacturing methods, the flange parts are formed into the shape of the rim flange parts while pressing the rim flange molding roller against the end parts of the flange parts in the direction of extension of the flange parts; as a result, spinning can be performed while preventing the flange parts from falling inward. Accordingly, the secondary molded product can be fit over and fastened to the rotating jig in a state in which deformation of the flange part in the direction of thickness is allowed as in Japanese Patent Application Laid-Open No. 2-160131, so that the thickness of the entire flange part can be increased while pressing the rim flange molding roller against the outer circumferential end part of the flange part, thus allowing gradual molding of the flange part into the shape of the rim flange part; consequently, rim flange parts that are formed with a large thickness as a result of this increase in thickness can be molded using a relatively low-output spinning apparatus. Moreover, in this manufacturing method, since there is no need to prevent the flange parts from falling inward during spinning, the molded rims can easily be removed from the rotating jig while causing the surfaces that engage with the tire on the tire sides of the rim flange parts to protrude.

Here, in order to effectively prevent the rim flange parts from falling inward during spinning, it is desirable to use a roller in which a rolling groove with a cross-sectional shape that conforms to the cross-sectional shape of the rim flange part is formed in the outer circumferential part of the roller as the rim flange molding roller.

In the first and second wheel manufacturing methods of the present invention, the thickness of the flange parts can be increased to form rim flange parts of an appropriate size using a low-output spinning apparatus that allows inexpensive manufacture. Accordingly, even in two-piece type wheels and three-piece type wheels that allow production of small quantities of diverse types, it would be possible to manufacture wheels that are superior in terms of the strength and rigidity in the rim flange parts; moreover, the accumulation of the plating liquid in the rim flange parts can be securely prevented, so that corrosion of the rim flange parts caused by such accumulation of the plating liquid can be securely prevented.

Here, if a roller in which a rolling groove with a cross-sectional shape that conforms to the cross-sectional shape of the rim flange part is formed in the outer circumferential part is used as the abovementioned rim flange molding roller, the outer circumferential edge part of the flange part can be received by this rolling groove, so that the rim flange part can be even more effectively prevented from falling inward during spinning.

DESCRIPTION OF THE PREFERRED EMBODIMENTS

Embodiments of the present invention will be described below with reference to the attached figures.

First, the vehicle wheel 1 will be described.

Figure 1:
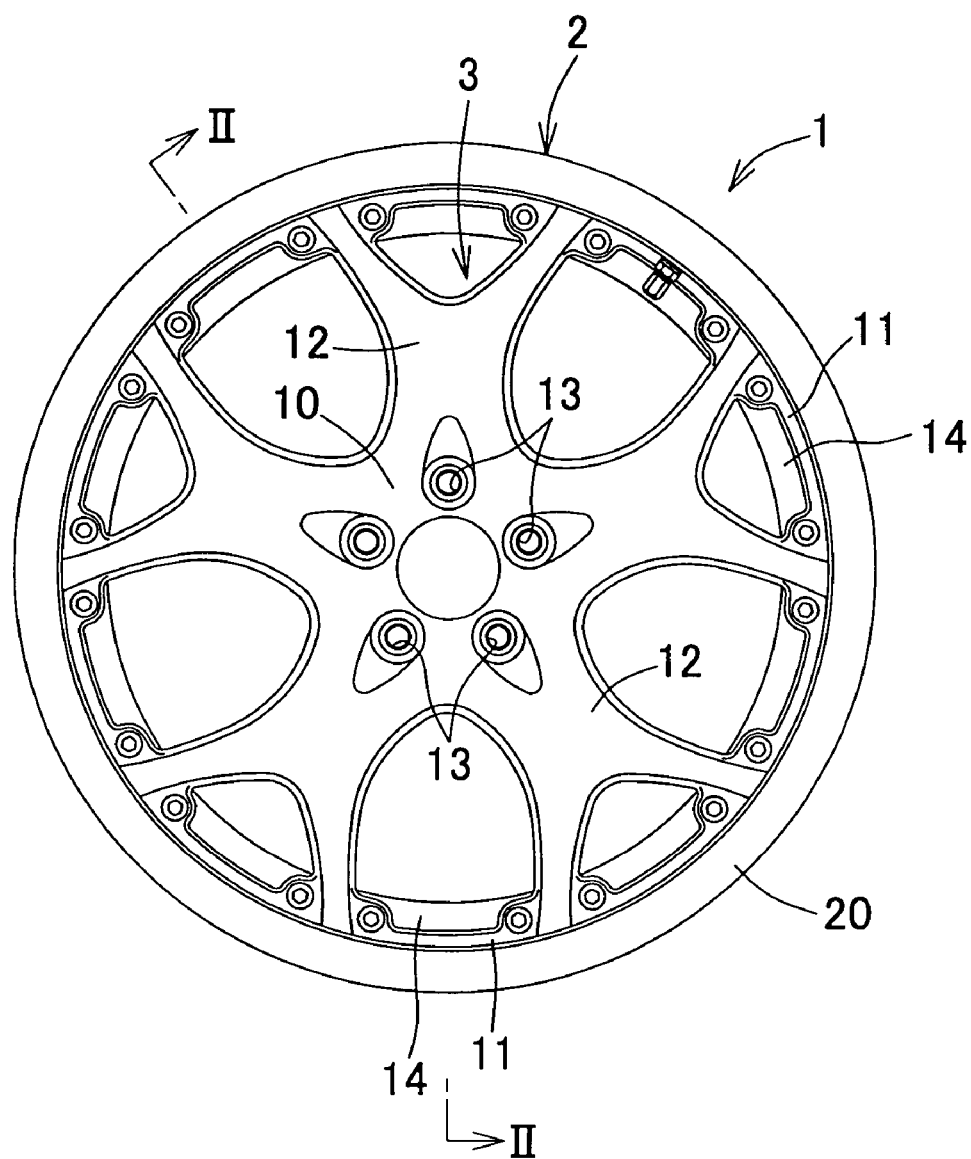
FIG. 1 is a front view of a two-piece type wheel.
Figure 2:
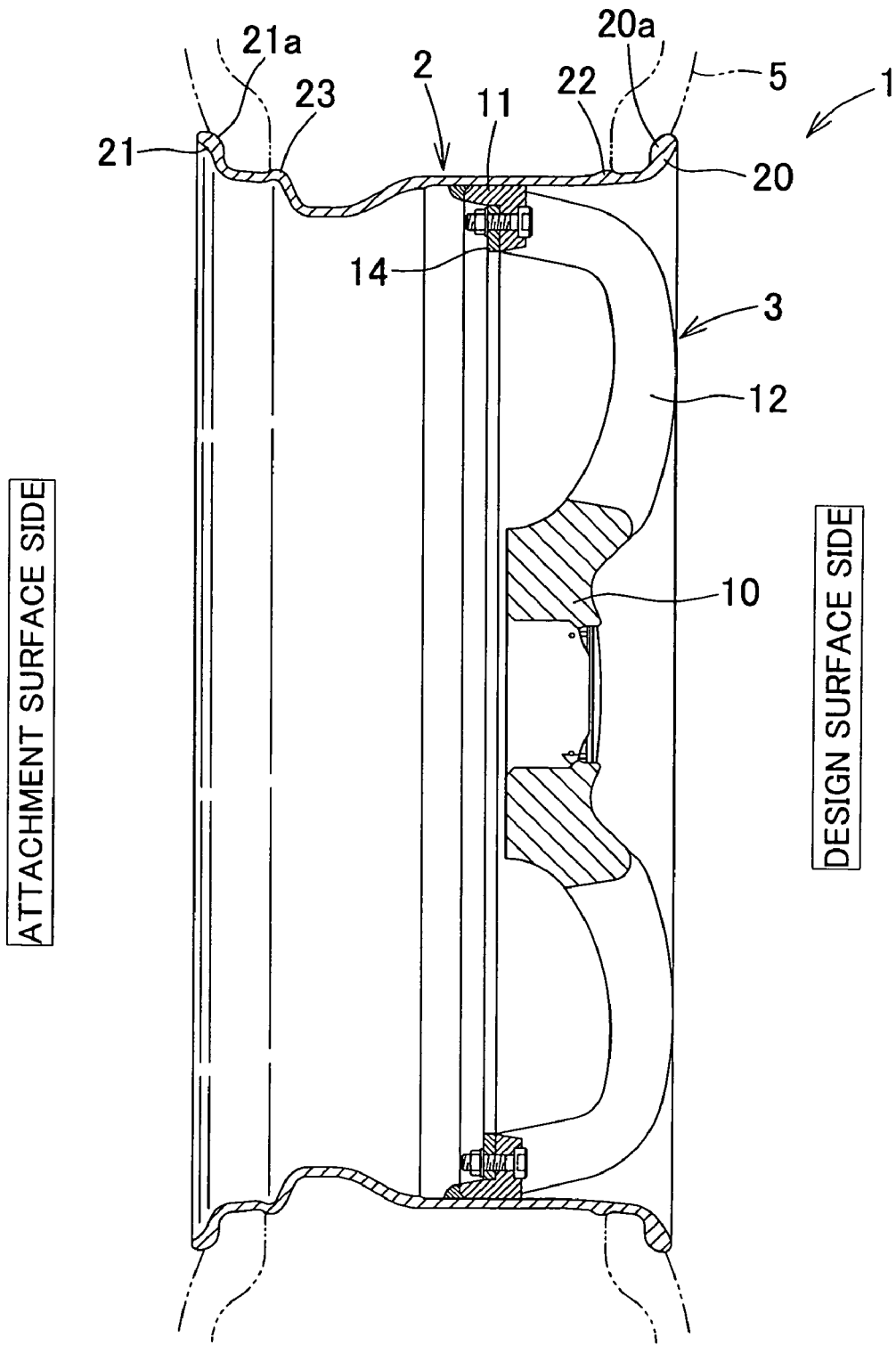
FIG. 2 is a sectional view along line II-II in FIG. 1.

As is shown in FIGS. 1 and 2, this vehicle wheel 1 is a two-piece type wheel, and comprises a substantially cylindrical rim 2 and a disk 3 which is disposed on the inside of the rim 2, and whose outer end part is fastened to the inner circumferential surface of the rim 2 by welding.

The disk 3 is integrally molded by casting, press-molding, forging or the like using a light metal alloy material such as an aluminum alloy or the like, and comprises an attachment part 10 used for attachment to a wheel supporting member (not shown in the figures) disposed on the side of the vehicle body, an annular ring part 11 disposed so as to surround the attachment part 10, and spoke parts 12 that connect the attachment part 10 and ring part 11; the ring part 11 is fastened by welding to the inside surface of the rim 2, and is thus assembled on the inside of the rim 2.

Five bolt passage holes 13 are formed in the attachment part 10 at fixed intervals in the circumferential direction on a circle centered on the rotational center of the wheel 1; these bolt passage holes 13 are disposed in positions corresponding to bolts (not shown in the figures) that are caused to protrude from the wheel supporting member. The tip end parts of the spoke parts 12 are formed in a bifurcated shape in order to enhance the design characteristics of the wheel 1, and are connected to the ring part 11. The number, shape and layout of these spoke parts 12 can be arbitrarily set with the design and strength of the wheel 1 being taken into account. The spoke parts 12 need not necessarily be constructed with a bifurcated shape, and the number of spoke parts 12 may be a number other than five. The ring part 11 is formed in a cross-sectional L shape, and a decorative plate 14 is attached to the attachment surface side of the ring part 11. The cross-sectional shape of the ring part 11 may be arbitrarily set. Furthermore, the decorative plate 14 is used merely to enhance the design characteristics of the wheel 1, and may be omitted.

The rim 2 is constructed from a metal material that is superior in terms of ductility such as an aluminum alloy or the like. An outer rim flange part 20 and an inner rim flange part 21 which are constructed with an increased thickness compared to other parts (by increasing the thickness of these rim flange parts) are formed on the design surface side end part and attachment surface side end part of the rim 2, and engaging parts 20a and 21a protruding in a curved shape that make a dovetail engagement with the tire 5 are formed on the tire (5) mounting surface sides of both rim flange parts 20 and 21. However, for example, the inner rim flange part 21 may be constructed with a universally known shape such as a shape in which the outer end part is bent toward the rotational center in substantially a U shape.

Since both rim flange parts 20 and 21 are thus constructed with a large thickness by increasing the thickness, the accumulation of the plating liquid inside the rim flange parts 20 and 21 can be securely prevented when the wheel 1 is subjected to a plating treatment, so that corrosion of the rim flange parts 20 and 21 as a result of such accumulation of the plating liquid can be prevented. Furthermore, since the outer rim flange part 20 is constructed with a large thickness, the strength and rigidity of the wheel 1 during turning and the like can be sufficiently guaranteed. Moreover, since the inner rim flange part 21 does not have as strict requirements with respect to strength and rigidity as the outer rim flange part 20, this rim flange part 21 can be constructed (for example) so that there is no accumulation of the plating liquid by bending the outer circumferential end part toward the rotational center in substantially a U shape.

An outer hump part 22 and inner hump part 23 that protrude outward in the radial direction are formed in the vicinity of both ends of the rim 2 around the entire circumference of the outer circumferential surface of the rim 2, and both hump parts 22 and 23 and both rim flange parts 20 and 21 are respectively joined to the inner circumferential end of the tire 5, so that movement of the tire 5 in the axial direction of the wheel is restricted.

Next, the method of manufacture of the abovementioned wheel 1 will be described.

Figure 3:
FIGS. 3A and 3B are explanatory diagrams of the pressing step.
FIGS. 3C and 3D are explanatory diagrams of the working step.
Figure 3:
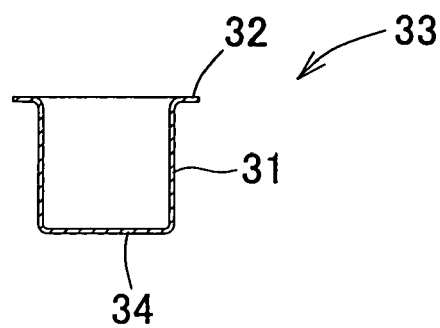
Figure 3:
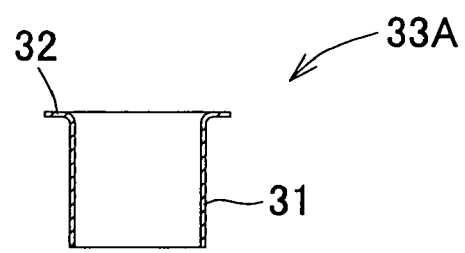
Figure 3:
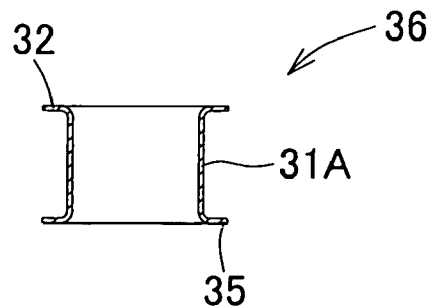

First, in the pressing step, as is shown in FIG. 3A, a circular disk form rolled metal plate 30 made of a material that is superior in terms of ductility such as an aluminum alloy or the like is press-molded, thus producing a primary molded product 33 which has a body part 31 having a cylindrical shape with a bottom, and a flange part 32 which extends outward from the open end part of the body part 31 in a direction that is substantially perpendicular to the center line of the body part 31 as shown in FIG. 3B.

Next, in the working step, as is shown in FIG. 3C, the bottom part 34 of the primary molded product 33 is removed by stamping or the like; then, as is shown in FIG. 3D, a flange part 35 is press-molded on the open end part of the primary molded product 33A from which the bottom part 34 has been removed, thus producing a secondary molded product 36 in which flange parts 32 and 35 are formed on both end parts of the cylindrical body part 31A.

Figure 4:
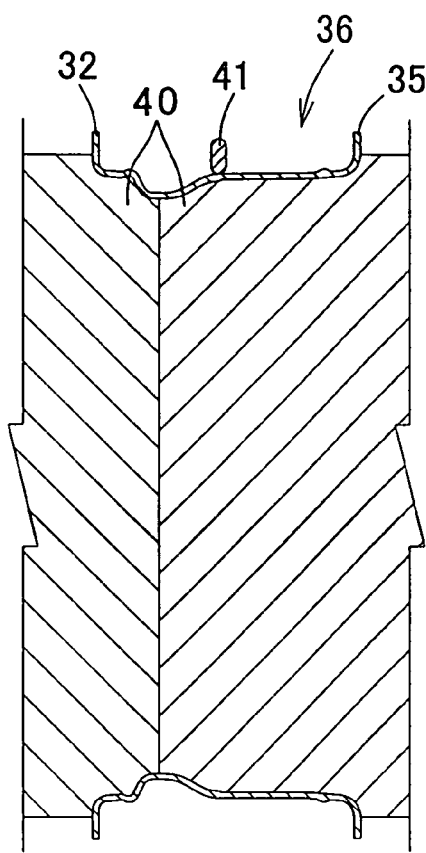
FIG. 4 is an explanatory diagram of the first spinning step.

Next, in the first spinning step, as is shown in FIG. 4, the secondary molded product 36 is fit over and fastened to a mandrel 40, and spinning is performed on the secondary molded product 36 using a roller 41 while rotating the secondary molded product 36 together with the mandrel 40, thus forming an intermediate part of the secondary molded product 36 (excluding both flange parts 32 and 35) into a rim shape.

Figure 5:
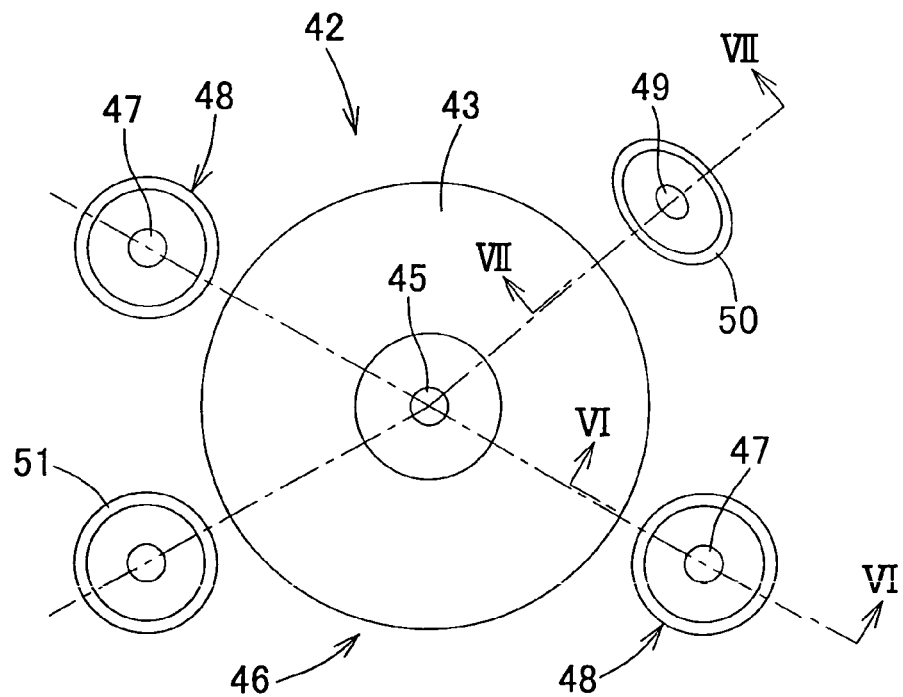
FIG. 5 is a schematic plan view of the spinning apparatus.
Figure 6:
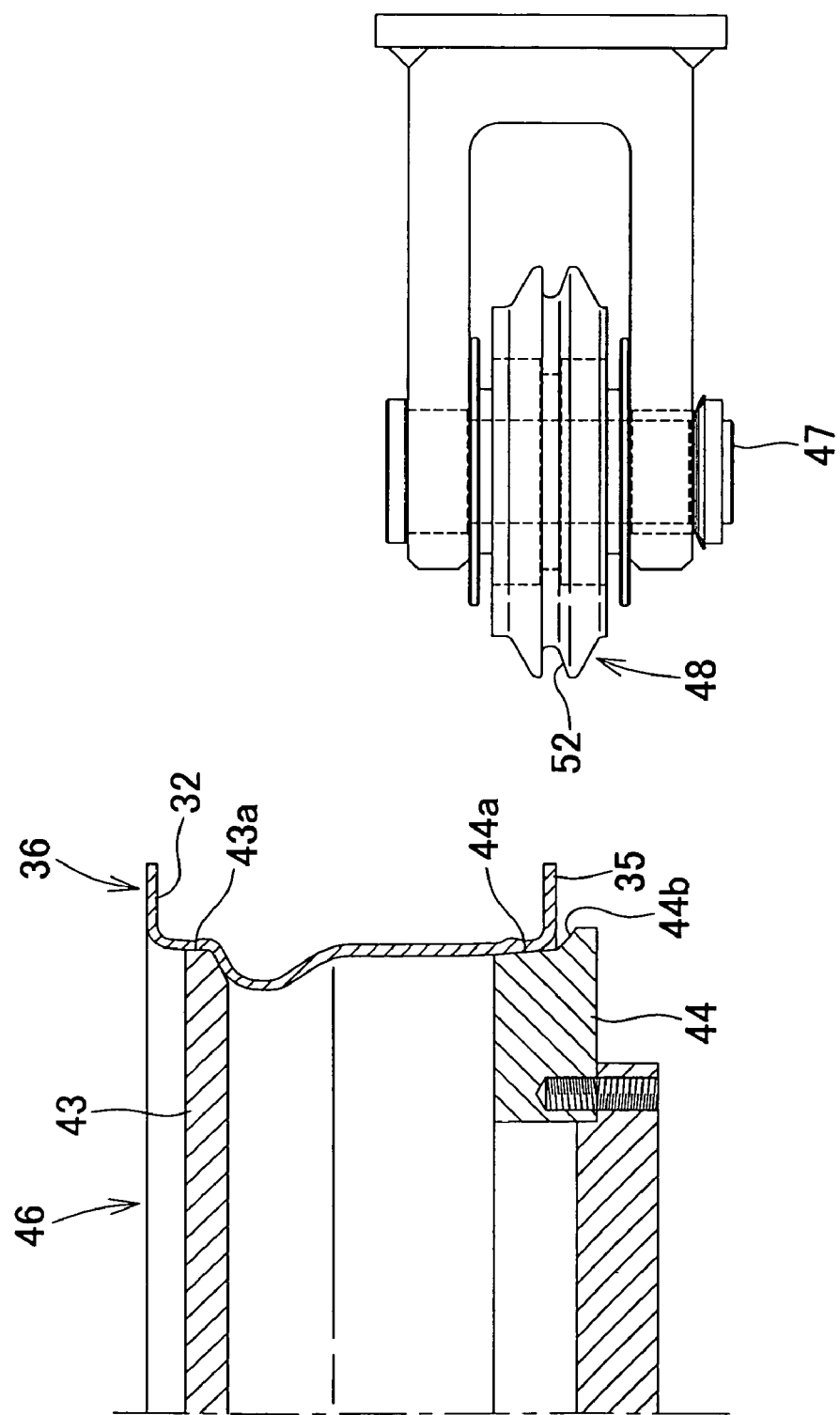
FIG. 6 is a sectional view of the spinning apparatus with the wheel attached along line VI-VI in FIG. 5.
Figure 7:
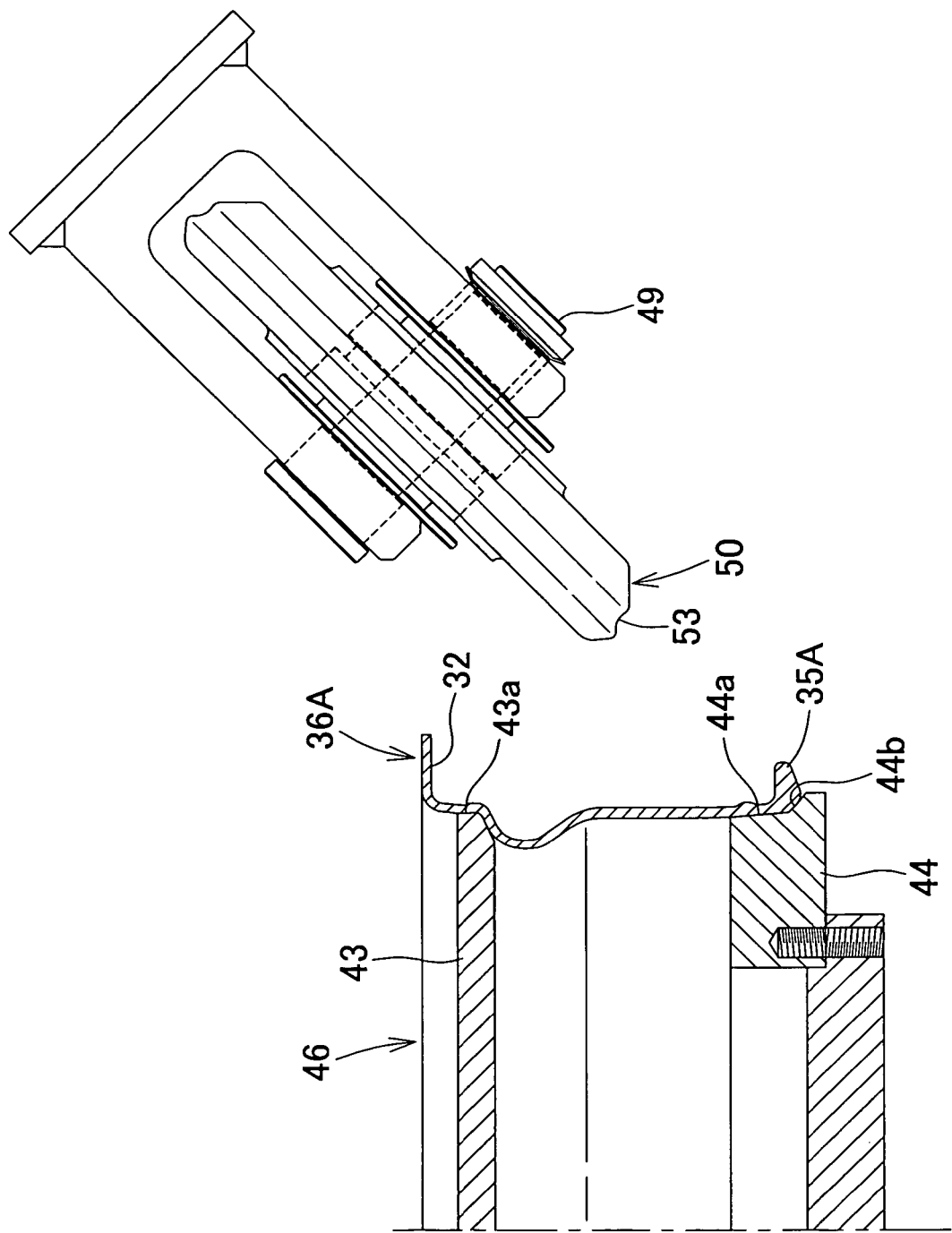
FIG. 7 is a sectional view of the spinning apparatus with the wheel attached along line VII-VII in FIG. 5.

Next, in the second spinning step, an outer rim part 20 and an inner rim part 21 are successively formed on the secondary molded product 36 using a spinning apparatus 42 constructed as shown in FIGS. 5 through 7. Here, it would also be possible to form the area between the two flange parts 32 and 35 of the secondary molded product 36 into a rim shape in the first spinning step after forming both rim flange parts 20 and 21 on the secondary molded product 36 in the second spinning step.

This spinning apparatus 42 comprises a rotating jig 46 which has a pair of circular disk form holding plates 43 and 44 disposed above and below with a gap between the two plates, and in which a rotating shaft 45 is installed in the vertical direction, driving means (not shown in the figures) which rotationally drive the rotating jig 46, a pair of rim flange molding rollers 48 which are disposed on both sides of the rotating jig 46 facing the underside flange part 35 of the secondary molded product 36 held on the rotating jig 46, so that these rollers are free to rotate about a rotating shaft 47 in the vertical direction, driving means (not shown in the figures) which drive the rim flange molding rollers 48 in an advancing and retracting motion in the radial direction of the rotating jig 46, an angle adjustment roller 50 which is disposed facing the underside flange part 35 of the secondary molded product 36 held on the rotating jig 46 so that this roller 50 is free to rotate about a rotating shaft 49, and driving means (not shown in the figures) which drive the angle adjustment roller 50 in an advancing and retracting motion in the radial direction of the rotating jig 46, and which drive this roller in a turning motion in the vertical direction about the vicinity of the underside flange part 35. Furthermore, the symbol 51 indicates a hump forming roller; however, since this roller 51 has no direct connection with the present invention, a detailed description of this roller is omitted.

A rolling groove 52 with a substantially V-shaped cross-sectional shape that conforms to the cross-sectional shape of the rim flange parts 20 and 21 is formed in the outer circumferential part of the rim flange molding roller 48, and an annular groove 53 with a substantially U-shaped cross-sectional shape that conforms to the shape of the outer circumferential end parts of the rim flange parts 20 and 21 is formed in the outer circumferential part of the angle adjustment roller 50.

When the rim flange parts 20 and 21 are formed using this spinning apparatus 42, first, as is shown in FIG. 6, the upper and lower flange parts 32 and 35 of the secondary molded product 36 are fit over the receiving surfaces 43a and 44a formed on the outer circumferential parts of the holding plates 43 and 44, so that the secondary molded product 36 is fit over and fastened to the rotating jig 46. In this case, at least the flange part 35 is disposed as a free end extending outward from the rotating jig 46 so that deformation in the direction of thickness is possible.

Figure 8:
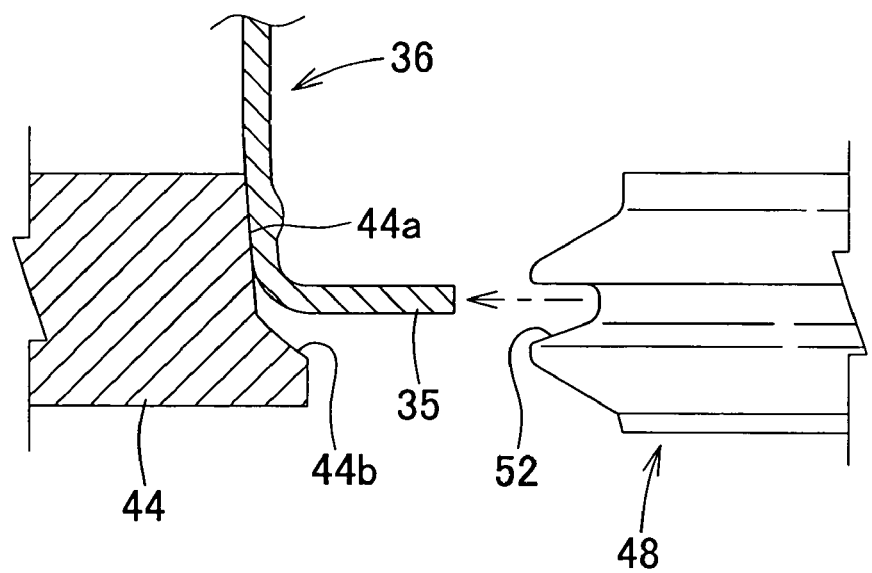
FIG. 8A shows explanatory diagrams of the flange part molding method using a flange rim molding roller before molding and FIG. 8B after molding.
Figure 8:
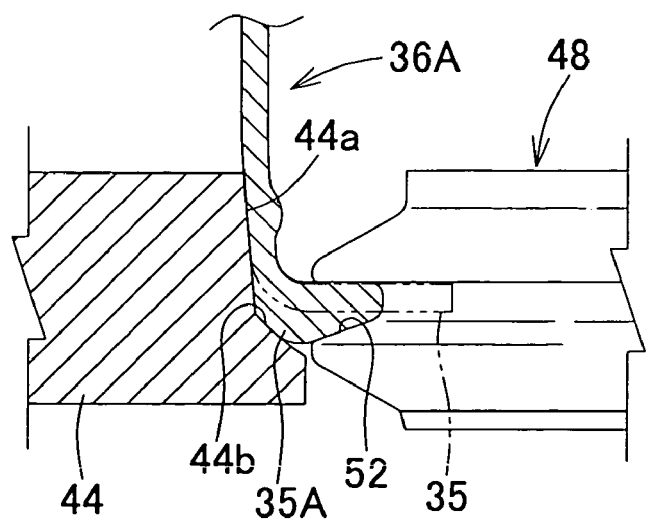

Next, while the secondary molded product 36 is caused to rotate at a rotational speed of 50 to 500 rpm together with the rotating jig 46, the rim flange molding roller 48 is pressed against the outer circumferential end part of the underside flange part 35 in the direction of extension of the flange part 35 with a pressing force of 3 to 10 t as shown in FIGS. 8A and 8B, and the rim flange molding roller 48 is successively pressed against the entire circumference of the flange part 35 while causing the rim flange molding roller 48 to perform a following rotation according to the rotation of the rotating jig 46, so that the flange part 35 is molded into a flange part 35A with the shape of the outer rim flange part 20 while deformation is caused to occur so that the thickness of the flange part 35 gradually increases, thus producing a secondary molded product 36 having this flange part 35A. In this case, the pressing force from the rim flange molding roller 48 that acts on the flange part 35 is received by the receiving plate 44a of the lower side holding plate 44. Furthermore, the outer circumferential end part of the flange part 35 can undergo deformation in the vertical direction. Here, however, since the rim flange molding roller 48 is driven toward the center along the radial direction of the rotating jig 46, i.e., in the direction of extension of the flange part 35, and is pressed against the outer circumferential end part of the flange part 35, so that almost no load acts on the outer circumferential end part of the flange part 35 in the vertical direction, and also since [i] the pressing force of the rim flange molding roller 48 that acts on the flange part 35 is set at a relatively small 3 to 10 t, [ii] the outer circumferential end part of the flange part 35 is pressed against the deep end part of the rolling groove 52 of the rim flange molding roller 48, so that the movement of the outer circumferential end part of the flange part 35 in the vertical direction is restricted by this rolling groove 52, and [iii] the base part of the flange part 35 is received by a bent guide surface 44b formed in a protruding shape on the lower part of the outer circumference of the lower side holding plate 44, the thickness is gradually increased so that the flange part is formed into the shape of the outer rim flange part 20 without falling inward.

Figure 9:
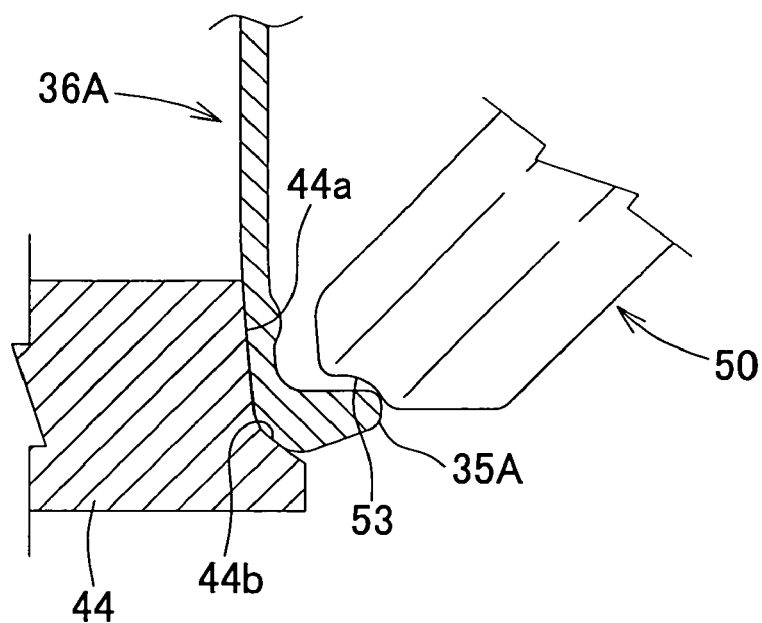
FIG. 9A shows explanatory diagrams of the flange part angle adjustment method using an angle adjustment roller before angle adjustment and FIG. 9B after angle adjustment.
Figure 9:
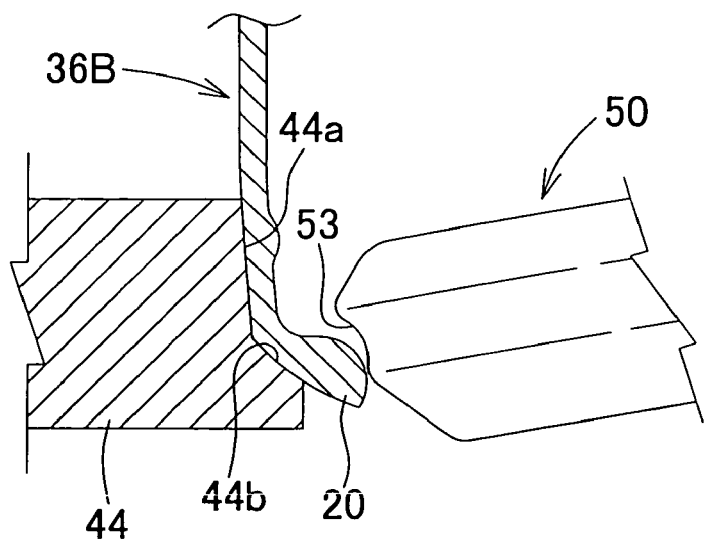

Next, while the secondary molded product 36A having the flange part 35A is caused to rotate together with the rotating jig 46, the annular groove 53 of the angle adjustment roller 50 is pressed against the outer circumferential end part of the flange part 35A at an inclination from above so that the outer surface of the flange part 35A is adjusted as shown in FIG. 9A, and at the same time, the angle adjustment roller 50 is gradually inclined downward, so that the flange part 35A is deformed downward until an appropriate angle is reached, thus producing a secondary molded product 36 which has an outer rim flange part 20 with an appropriate shape as shown in FIG. 9B.

Next, the secondary molded product 36B is inverted and re-attached to the rotating jig 46, and spinning is performed on the flange part 32 in the same manner as described above, so that the inner rim flange part 21 is molded. Furthermore, it would also be possible to mold the outer rim flange part 20 following the molding of the inner rim flange part 21. Moreover, the molding of both flange parts 32 and 35 can be performed using a single spinning apparatus 42; however, it would also be possible to successively mold both of these flange parts using two spinning apparatuses 42.

If necessary, the rim 2 thus manufactured is subjected to a plating treatment, and a wheel 1 is then obtained by fastening the disk 3 (manufactured beforehand) to an intermediate part of the rim 2 (in the axial direction) by welding.

In this manufacturing method, since both rim flange parts 20 and 21 can be molded by gradually increasing the thickness of the flange parts 32 and 35 while pressing a rim flange forming roller 48 against the flange parts 32 and 35, both rim flange parts 20 and 21 can be molded using a relatively small-output spinning apparatus 42. Furthermore, in the second spinning step, both rim flange parts 20 and 21 can be formed with a large thickness by increasing the thickness of the flange parts 32 and 35 without folding back or curling the flange parts 32 and 35; accordingly, the invasion of the interiors of the rim flange parts 20 and 21 by the plating liquid during plating can be securely prevented, so that corrosion of the rim flange parts 20 and 21 by the plating liquid can be effectively prevented, while increasing the strength and rigidity of the rim 2.

Next, another embodiment in which the construction of the abovementioned manufacturing method is partially altered will be described. Furthermore, members that are the same as in the abovementioned embodiment are labeled with the same symbols, and a detailed description of such members is omitted.

(1) In the abovementioned embodiment, both rim flange parts 20 and 21 were molded by increasing the thickness of the flange parts 32 and 35. However, since the inner rim flange part 21 on the attachment surface side has lower requirements regarding strength and rigidity than the outer rim flange part 20 on the design surface side, it would also be possible to mold only the outer rim flange part 20 by increasing the thickness of the flange part 35 as described above, and to mold the inner rim flange part 21 by (for example) a universally known method in which the outer end part is bent toward the center of the wheel 1 in substantially a U shape.

Figure 10:
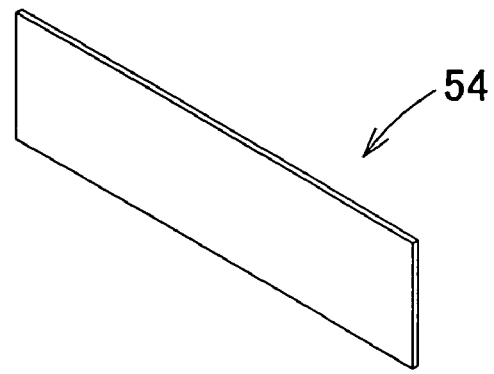
FIGS. 10A and 10B show explanatory diagrams of the welding step and FIG. 10C shows an explanatory diagram of the working step, in another manufacturing method.
Figure 10:
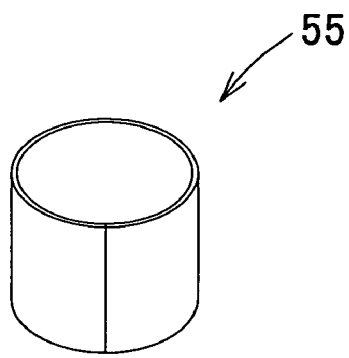
Figure 10:
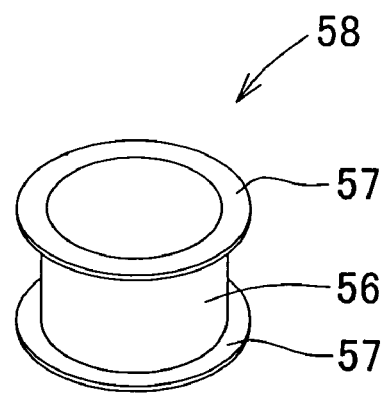

(2) In the abovementioned embodiment, a secondary molded product 36 in which flange parts 32 and 35 were formed on both end parts of a cylindrical body part 31A was manufactured. However, it would also be possible to manufacture a primary molded product 55 by rolling up a band form rolled metal plate 54 into a cylindrical shape and joining both ends by welding in the welding step shown in FIGS. 10A and 10B, and to bend both end parts of the primary molded product 55 in the working step shown in FIG. 10C, so that a secondary molded product 58 in which flange parts 57 that extend outward in a direction substantially perpendicular to the center line are formed on both end parts of a body part 56. Then, this secondary molded product 58 can be used as the secondary molded product 36.

Next, an embodiment in which the present invention is applied to a method for manufacturing a three-piece type wheel will be described.

Figure 11:
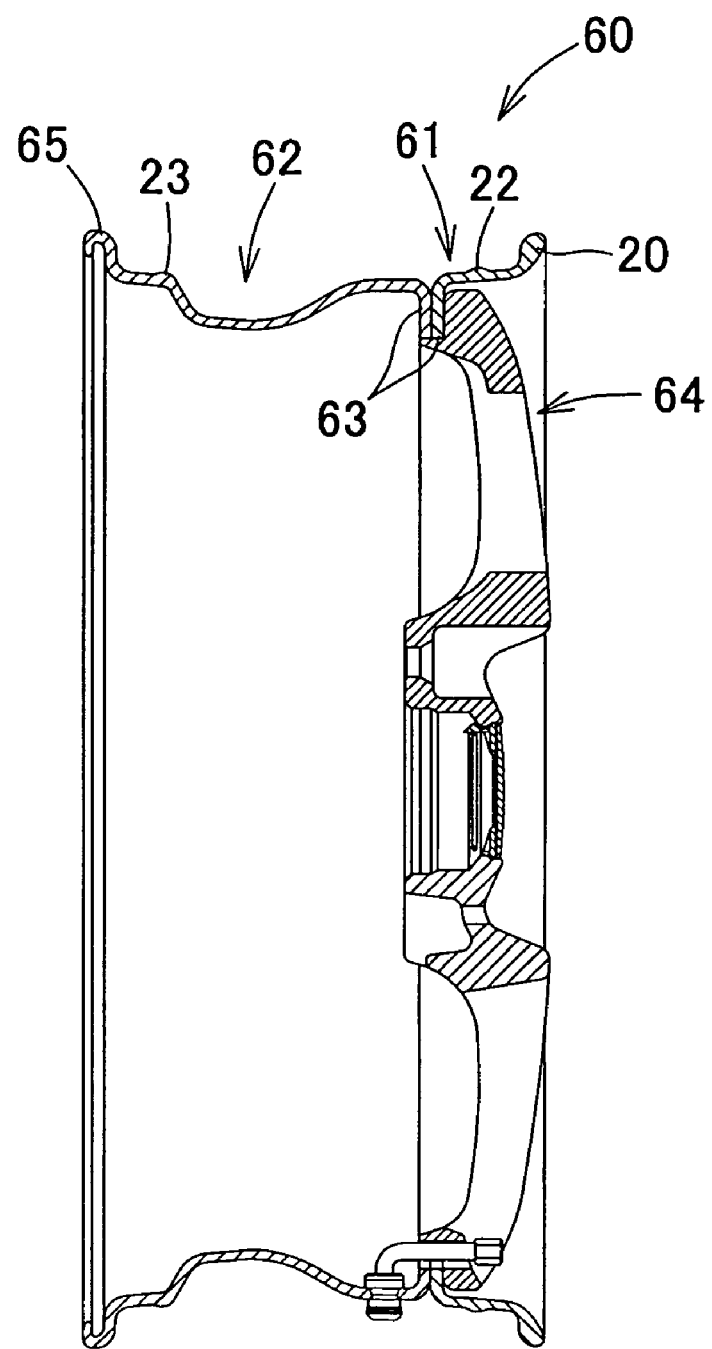
FIG. 11 shows a longitudinal sectional view of a three-piece type wheel.

First, the construction of the three-piece type wheel will be described. In this wheel 60, as is shown in FIG. 11, the rim 2 in the abovementioned embodiment is split into an outer rim 61 and an inner rim 62. Flange-form joining parts 63 that protrude inward are formed on one end part of both the outer rim 61 and inner rim 62, and a disk 64 is integrally joined to both rims 61 and 62 by bolts (not shown in the figures) at the joining parts 63; furthermore, an outer rim flange part 20 which is formed by increasing the thickness is formed on the design surface side end part of the outer rim 61, and an inner rim flange part 65 which is formed by increasing the thickness is formed on the attachment surface side end part of the inner rim 62. Here, if at least one of the two rim flange parts, i.e., the outer rim flange part 20 or inner rim flange part 65, is constructed as a flange part that is formed by increasing the thickness, a flange part with a universally known construction in which the outer circumferential end part on the attachment surface side of the rim is bent in substantially a U shape can be used for the other flange part.

When such a wheel 60 is manufactured, first, in the pressing step, a circular disk form rolled metal plate 30 made of a material that is superior in terms of ductility such as an aluminum alloy or the like is press-molded as in the abovementioned embodiment, so that a primary molded product 33 which has a body part 31 with a cylindrical shape that has a bottom, and a flange part 32 that extends outward from the open end part of the body part 31 in a direction that is substantially perpendicular to the center line of the body part 31, is manufactured as shown in FIGS. 3A and 3B. Here, the length of the body part 31 is set so as to match the length of the outer rim 61.

Next, in the working step, as is shown in FIG. 3C, the bottom part 34 of the primary molded product 33 is removed by stamping or the like, thus producing a secondary molded product 36. However, this secondary molded product 36 differs from that of the abovementioned embodiment in that no flange part 32 is formed on the open end part formed by the removal of the bottom part 34. Furthermore, the entire bottom part 34 of the primary molded product 33 may be removed; however, would also be possible to form a flange part that extends toward the central part by removing only the central part of the bottom part 34, and to utilize this flange part as a joining part 63.

Next, as in the abovementioned embodiment, the secondary molded product 36 is fit over and fastened to a mandrel 40 in the first spinning step, and a rim flange molding roller 48 is pressed against the secondary molded product 36 while rotating the secondary molded product 36 together with the mandrel 40, so that an intermediate part of the secondary molded product 36 in the longitudinal direction is molded into the outer rim shape. Then, in the second spinning step, the thickness of the flange part 32 is increased to form the outer rim flange part 20, thus producing an outer rim 61.

After the outer rim 61 has thus been manufactured, an inner rim 62 manufactured beforehand by a universally known manufacturing method is superimposed on the outer rim 61 at the joining parts 63, the outer circumferential part of the disk 64 is superimposed on the joining parts 63, and the disk 64 is integrally joined to both rims 61 and 62, thus producing a wheel 60.

Furthermore, in the manufacturing method of this three-piece type wheel 60, as in the abovementioned embodiment, a secondary molded product 36 produced by forming a cylindrical primary molded product 55 by rolling up a sheet and welding both end parts, and press-molding a flange part 35 on one end part of this primary molded product 55, can be used as the secondary molded product 36.

What is claimed is:

1. A wheel manufacturing method comprising:

a pressing step in which a primary molded product having a cylindrical shape with a bottom in which a flange part that extends to the outside in a direction substantially perpendicular to the center line is disposed on the open side end part is manufactured by press-molding a rolled metal plate;

a working step in which a secondary molded product is obtained by cutting away the bottom part of said primary molded product; and a spinning step in which, while the flange part is allowed to deform in the direction of the thickness thereof, the secondary worked product is fit over and fastened to a rotating jig having a receiving surface that receives the flange part from the inside, a rim flange molding roller is pressed against the end part of the flange part in the direction of extension of the flange part while the secondary worked product is rotated together with the rotating jig, so that the flange part is gradually molded into the shape of a rim flange part, and the flange part is subsequently subjected to an angular adjustment to an appropriate angle to mold a rim flange part.

2. The wheel manufacturing method according to claim 1, wherein, in the working step, the bottom part of the primary molded product is cut away, and a flange part that extends to the outside in a direction substantially perpendicular to the center line is also molded on the end part located on the, opposite side from the flange part of the primary molded product, to manufacture a secondary molded product which has flange parts on both end parts.

3. The wheel manufacturing method according to claims 1 or 2, wherein a roller in which a rolling groove with a cross-sectional shape that conforms to the cross-sectional :shape of the rim flange part is formed in the outer circumferential part of the roller is used as said rim flange molding roller.

* * * * *